United States Patent [19]

Kreisner

[11] Patent Number: 4,858,122

[45] Date of Patent: Aug. 15, 1989

[54] RANDOM LOTTERY COMPUTER

[76] Inventor: William Kreisner, 77 St. Marks La., Islip, N.Y. 11751

[21] Appl. No.: 909,280

[22] Filed: Sep. 19, 1986

Related U.S. Application Data

[63] Continuation-in-part of Ser. No. 655,911, Sep. 28, 1984, abandoned.

[51] Int. Cl.⁴ .............................................. G06F 15/28

[52] U.S. Cl. .................................... 364/410; 364/412; 273/269

[58] Field of Search ................................ 364/410–412, 364/717; 273/269, 274, 138 A

[56] References Cited

U.S. PATENT DOCUMENTS

| | | |
|---|---|---|
| 2,206,865 | 7/1940 | David et al. . |
| 2,294,444 | 9/1942 | Boroughs . |
| 3,612,845 | 10/1971 | Lawlor . |
| 3,653,026 | 3/1972 | Hurley . |
| 3,984,107 | 10/1976 | Nelson . |
| 4,151,404 | 4/1979 | Harrington et al. . |
| 4,171,540 | 10/1979 | Arnold . |
| 4,188,779 | 2/1980 | Fatton . |
| 4,228,596 | 10/1980 | Daniel . |
| 4,277,064 | 7/1981 | Newman . |
| 4,348,744 | 9/1982 | White . |
| 4,355,361 | 10/1982 | Riggs et al. . |
| 4,355,366 | 10/1982 | Porter . |
| 4,421,314 | 12/1983 | Stancill . |
| 4,494,197 | 1/1985 | Troy et al. . |
| 4,527,798 | 7/1985 | Siekierski et al. . |
| 4,573,681 | 3/1986 | Okada . |
| 4,586,710 | 5/1986 | Beam ................................. 364/412 |

FOREIGN PATENT DOCUMENTS

| | | |
|---|---|---|
| 1101998 | 5/1981 | Canada . |
| 3310919 | 8/1984 | Fed. Rep. of Germany . |
| 2425681 | 12/1979 | France . |
| 2520243 | 7/1983 | France . |
| 57-19889 | 2/1982 | Japan . |
| 2105996 | 4/1983 | United Kingdom . |

OTHER PUBLICATIONS

D. Burns, *Practical Electronics*, vol. 12, pp. 969–975 (Dec. 1976).

P. Conant, *Electrical Design News*, vol. 29, p. 323 (May 3, 1984).

*Primary Examiner*—E. A. Goldberg
*Assistant Examiner*—Lincoln Donovan
*Attorney, Agent, or Firm*—Pennie & Edmonds

[57] ABSTRACT

A random lottery computer which can be pre-programmed for various lottery markets is provided. Lotteries vary in the number of selections to be made, the range for each selection and whether the selections are single digit or double digit. A microprocessor controlled system, with random number generation, is programmed for these various lottery parameters by a game selector switch and by push button switches which increment or decrement the selection range. The lottery computer may be battery powered or light powered. Provision is made for initializing the microprocessor when power is first applied. Power is also disconnected after a given interval.

14 Claims, 2 Drawing Sheets

RANDOM LOTTERY COMPUTER

This is a continuation-in-part of application Ser. No. 06/655,911 filed Sept. 28, 1984, now abandoned.

BACKGROUND OF THE INVENTION

1. Field of the Invention

The present invention relates generally to number generating devices and, more specifically, to electronic computing devices which generate random numbers appropriate to the playing parameters of various lottery games.

2. Description of the Prior Art

There are many situations in which it is desirable to be able to select numbers at random. One major application is the selection of lottery numbers. Different lotteries require varied selection of numbers. Numbers are most commonly selected individually or in pairs (i.e. 3-5-7 or 62-45-72-13); in varied clusters (i.e. three pairs 31-18-14, five pairs 12-11-43-23-54); and with different ranges for each individual number or pair (i.e. 0-9, 01-99). At the present state of the art there are no easy-to-use lightweight devices which can perform this function. Lottery selections made by simply thinking of a number are hardly random since the chooser's prior experiences and prejudices will interfere with randomness. Many of the organizations which run lotteries still use the process of selecting marked balls from a tumbler to obtain randomness. General purpose computers may be programmed with random number generating algorithms for this purpose, however they are heavy, expensive and this operation wastes their computing power.

A number of efforts have been made to provide random number selection systems; however, each has severe shortcomings. T. E. Beam (U.S. Pat. No. 4,586,710) provides a lottery selection device in which numbers are randomly generated. A pair of separate activator buttons 22, 28; a pair of separate number/digit-quantity selector slides 23, 27; and a pair of separate random number displays are provided for two types of lottery games: a plural-random-number selected-without-replacement type game, referred to in the patent as a "Lotto" game, and a single multidigit random number type game, referred to in the patent as a "Pick-it" game.

C. Lawlor (U.S. Pat. No. 3,612,845) provided a computer utilizing random pulse trains. In this circuit, noise signals from a diode and clock pulses from a clock pulse source are fed to input legs of a logic circuit such as an AND gate, causing pulses of various amplitudes to appear in the output of the circuit. Complex threshold circuits are then required to eliminate low level pulses leaving high level random pulses. Only one random output at a time is provided. S. Harrington et. al. (U.S. Pat. No. 4,151,404) provided a random digit generator which samples a random pulse output, displays that output, determines a second random number and adds it to the first and displays it. This system is clearly unsuitable for the present purpose because each output is inherently greater than the previous output and, therefore, while the first output is truly random, each succeeding output is not clearly random. T. Newman (U.S. Pat. No. 4,277,064) provided a lottery generating method and apparatus which requires a user to depress one pushbutton for each numeral to be randomly selected, whereas one pushbutton is clearly preferable. Also, each number is chosen independently of all previous choices; however, in most lotteries, no number may be selected twice, hence Newman's apparatus is nonfunctional for use in conventional lotteries. S. Troy, et. al. (U.S. Pat. No. 4,494,197) has an automatic lottery system which utilizes a central processing unit with remote terminals which communicate via dedicated phone line or microwave links, a configuration totally unsuitable for use as a hand-held pocket-sized lottery computer.

SUMMARY OF THE INVENTION

It is, therefore, a primary object of the present invention to provide a random lottery computer which provides a visual display of any number of randomly selected numbers.

A further object is to provide a random lottery computer in which each selection is made independent of any other selection.

Another object is to provide a random lottery computer in which each selection is made at random from a chosen range of numbers in which any of the previously selected numbers have been removed.

A yet further object is to provide a random lottery computer in which the upper limit of the numbers selected may be readily set. For example, each number selected may be limited to a random selection between x and y by depressing an UP button which increments the upper limit or a DOWN button which decrements the lower limit.

A yet further object is to provide a random lottery computer in which single digit selections and double digit selections may be made. For example, 3-6-9 is a single digit selection, whereas 25-43-21 is a double digit selection.

A yet further object is to provide a random lottery computer in which the number of selections made may be varied. For example, the selections 3-7-5 requires the selection of three single digit numbers, whereas the selection 4-2-7-8-1 requires the selection of five single digit numbers.

A yet still further object is to provide a random lottery computer in which the quantity of randomly selected digits, and whether they are single or double digit selections are controlled by slide switches, while and the upper limit of the selections is controlled by buttons which increment or decrement this limit.

A still further object is to provide a random lottery computer which encourages the player by flashing the words: GOOD LUCK.

A still further object is to provide a random lottery computer which may be powered by a battery, or, optionally by a solar cell.

A still further object is to provide a random lottery computer which is compact, easy to use and inexpensive to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Lottery computers used in common lotteries worldwide must generate random numbers without duplication. In order to implement one single lottery computer which can be used across a wide range of applications, three parameters must be able to be controlled: (1) the quantity of numeric entities to be selected; (2) the number of digits in each of these numeric entities; and, (3) the upper limit of each numeric entity. The instant invention allows the lottery player to easily set these parameters to rapidly select random numbers which meet the requirements of the particular lottery scheme.

Figure 1:
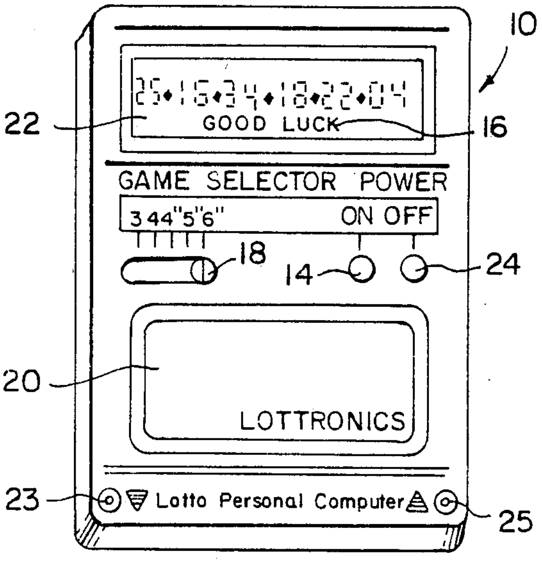
FIG. 1 is view of a battery powered embodiment of the invention.
Figure 2:
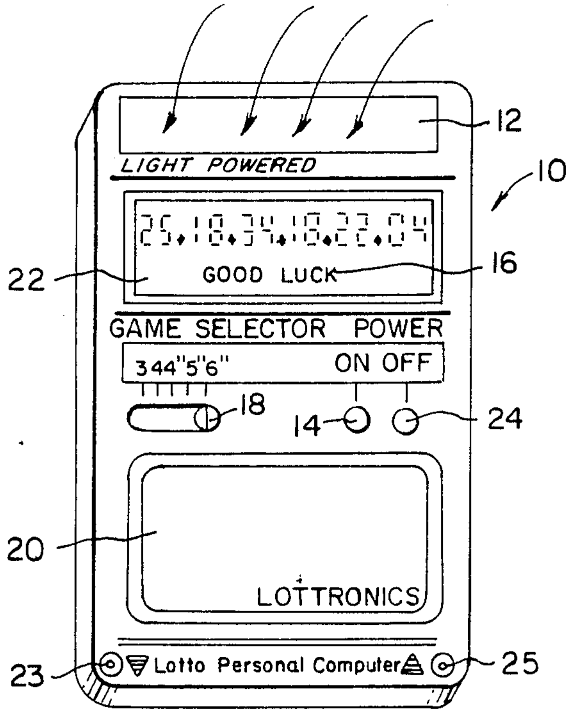
FIG. 2 is a perspective view of a light powered embodiment of the invention.

The invention 10 is illustrated in FIGS. 1 and 2 which are identical except for their power sources. The invention 10 is powered by an internal battery in FIG. 1 and by a solar cell 12 in FIG. 2. In operation when power on switch 14 is depressed, the display 16 flashes GOOD LUCK. The game is then selected by sliding game selector switch 18 to the appropriate position. In FIGS. 1 and 2, game selector switch 18 points to the "6" game thereby selecting a game to be played with "6" pairs of digits (i.e. 25-16-34-18-22-04). When lotto play button 20 is depressed the actual randomly selected number is displayed in LCD display 22 until power off switch 24 is depressed or until some pre-determined time interval has been reached.

Figure 1A:
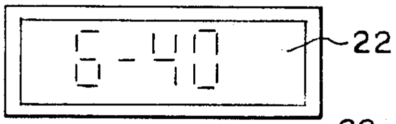
FIG. 1A is an alternate display of information which appears in the window of FIG. 1 when the invention is first activated. The display shows the number of digits displayed and the upper limit of their selection.

When the invention 10 is first turned on by switch 14, display 22 appears as in FIG. 1A. The number "6" in the display indicates that 6 pairs of digits are being selected. The number "40" in the display indicates that the upper limit for selection is 40, i.e. no pair of digits may exceed 40. This upper limit may be lowered one digit at a time, decremented, using decrement button 23, or may be raised one digit at a time, incremented, using increment button 25.

Figure 3:
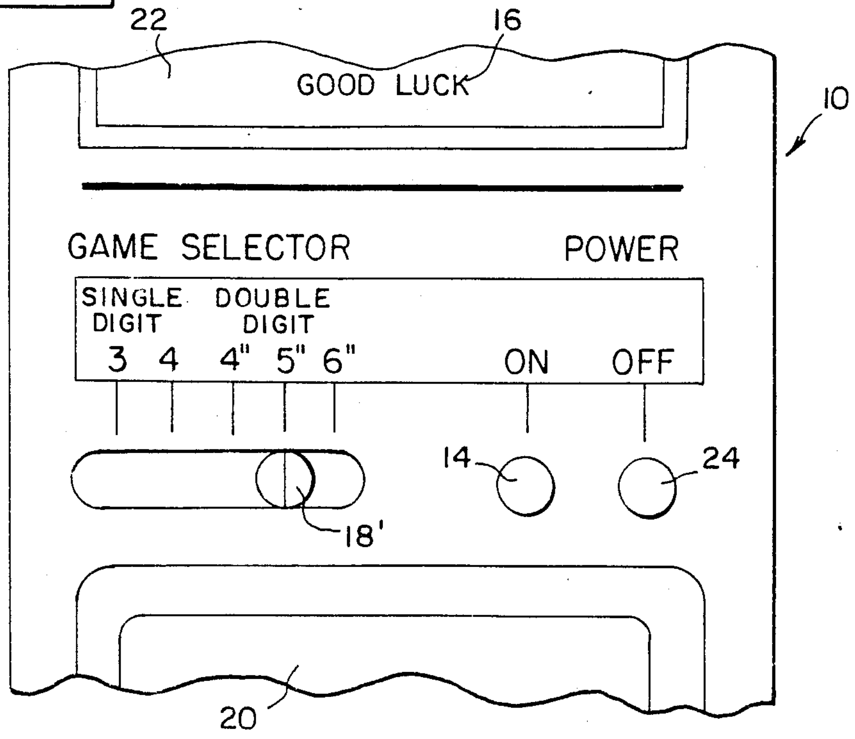
FIG. 3 is an enlarged detail partial view of an embodiment in which single digit and double digit games may be played.
Figure 4:
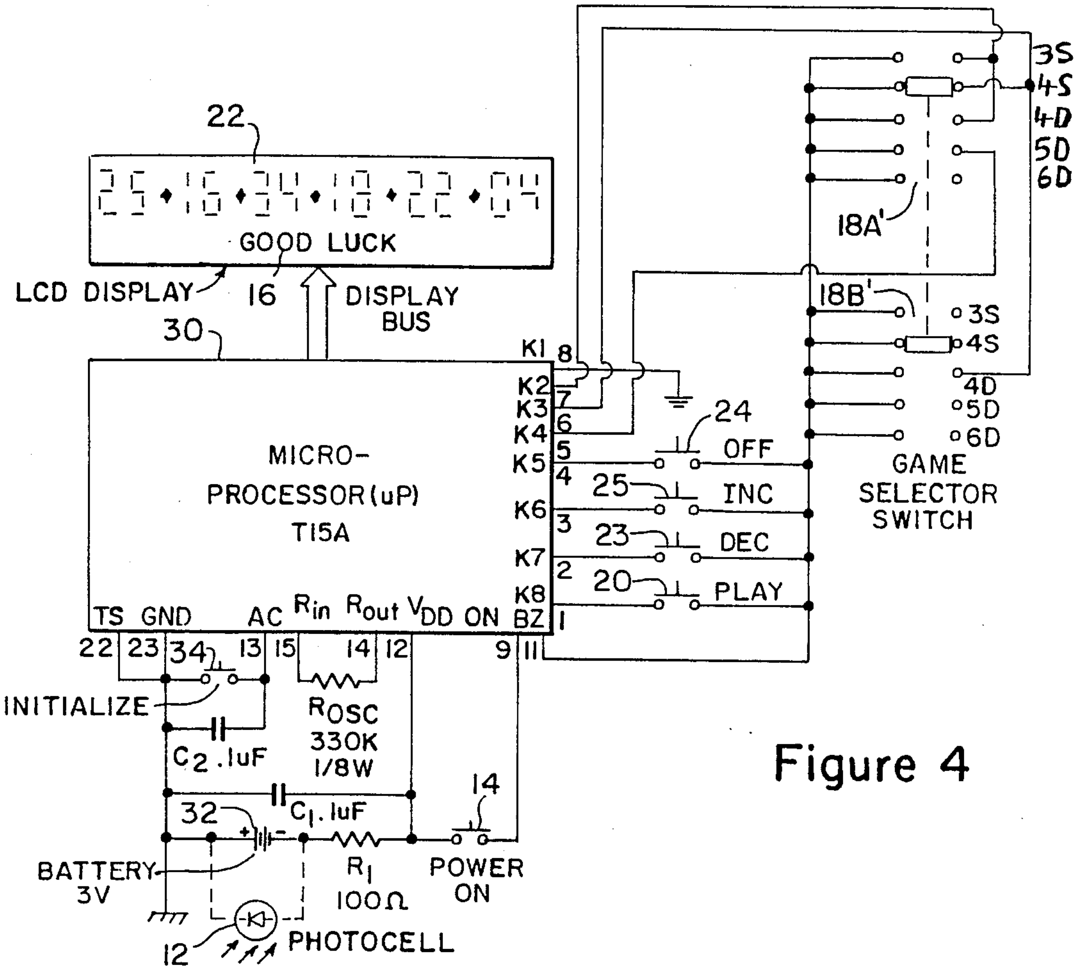
FIG. 4 is an electronic schematic diagram of the embodiment illustrated in FIG. 3.

The complete operation of an embodiment of invention 10, in which both single and double digit games may be played, is best understood with reference to FIGS. 3 and 4. When power on switch 14 is depressed T15A microprocessor (numeral 30) "on" input at pin 9 is activated and power from battery 32 is applied to microprocessor 30 $V_{DD}$ terminal at pin 12. This causes GOOD LUCK display 16 to flash. When battery 32 is first installed or changed, initialize switch 34 must be depressed in order to initialize or re-initialize microprocessor 30. If solar power is desired, photocell 12 is substituted for battery 32.

The game to be played must now be selected. This is accomplished by a system which includes game selector switch 18' which is a double pole five throw selector switch with sections 18A' and 18B', and increment pushbutton switch 25 and decrement pushbutton switch 23. Selector switch 18, inputs to microprocessor 30 whether the game is a single digit or a double digit game and the number of selections to be made. The "3S" position selects three single digits, the "4S" position selects four single digits, the "4D" position selects four double digits, the "5D" position selects five double digits, and the "6D" position selects six double digits. In the double digit modes, the increment button 25 increases the maximum limit of any of the selected pairs one digit at a time; while the decrement button 23 decreases the maximum limit of any of the selected pairs one digit at a time. The complete range of game possibilities is fixed programmed into microprocessor 30. The rate at which random numbers are selected is determined by the clock rate of microprocessor 30 which is in turn determined by oscillator resistor $R_{osc}$.

While certain novel features of this invention have been shown and described and are pointed out in the annexed claims, it will be understood that various omissions, substitutions and changes in the forms and the details of the device illustrated and in its operation can be made by those skilled in the art without departing from the spirit of the invention.

What is claimed is:

1. A random lottery computer for generating random numeric lottery selections, each lottery selection comprising a plurality of numeric entities, the random lottery computer comprising:

(a) a housing;

(b) a substantially visually unitary numeric display mounted in the housing for displaying the numeric lottery-selections generated by the random lottery computer;

(c) a microprocessor mounted in the housing having switch-state input terminals and display output terminals, the display output terminals being connected to the numeric display, the microprocessor being adapted to generate random numeric lottery selections in accordance with lottery-game requirements of a user-selectable one of a plurality of predetermined lottery games and transmitting display signals encoding such lottery selections from the display output terminals to cause such lottery selections to be displayed by the numeric display of the random lottery computer, a particular lottery game in accordance with which a lottery selection is made being specified by switch-state signals applied to switch-state input terminals of the microprocessor;

(d) electric power supply means located in the housing for supplying electric power to the microprocessor and the numeric display;

(e) a single user-positionable multiposition game-selector switch mounted in the housing of the random lottery computer and connected to switch-state input terminals of the microprocessor, each position of the game-selector switch being associated with a predetermined set of lottery-game requirements, the microprocessor being adapted to take account of the set of lottery-game requirements associated with any user-selected position of the game-selector switch in generating random numeric lottery selections, each such set of lottery-game requirements specifying at least a number of numeric entities included in the lottery selection for the game and a number of digits in each numeric entity, at least one first set of lottery-game requirements associated with a first position of the game-selector switch specifying one digit per numeric entity and at least one second set of lottery-game requirements associated with a second position of the game-selector switch different from said first position specifying two digits per numeric entity;

(f) an incrementing switch mounted in the housing and connected to a switch-state input terminal of the microprocessor, the microprocessor being adapted to increment in response to actuation of the incrementing switch an upper limit for the numeric entities for the random numeric lottery selections generated in accordance with the set of lottery-game requirements associated with at least one position of the game-selector switch, the position of the game-selector switch defining a settable-upper-limit-game position;

(g) a decrementing switch mounted in the housing and connected to a switch-state input terminal of the microprocessor, the microprocessor being adapted to decrement in response to actuation of the decrementing switch the upper limit for the numeric entities for the random numeric lottery selections generated in accordance with the set of lottery-game requirements associated with the settable-upper-limit-game position of the game-selector switch; and (h) a lottery-selection play switch mounted in the housing of the random lottery computer and connected to a switch-state input terminal of the microprocessor, the microprocessor being adapted to generate a random numeric lottery selection in response to actuation of the lottery-selection play switch in accordance with the set of lottery-game switch in accordance with the set of lottery-game requirements associated with any user-selected one of the positions of the game-selector switch and, to an extend consistent with said set of lottery-game requirements, the upper limit for the numeric entities of the random numeric lottery selections specified by actuation of the incrementing switch and the decrementing switch.

2. A random lottery computer, as recited in claim 1, wherein said numeric display is a liquid crystal display.

3. A random lottery computer, as recited in claim 1, wherein said numeric display is a light emitting diode display.

4. A random lottery computer, as recited in claim 1, wherein said numeric display is a fluorescent display.

5. A random lottery computer, as recited in claim 1, wherein said electrical power source is a battery.

6. A random lottery computer, as recited in claim 1, wherein said electrical power source is a photocell.

7. A random lottery computer, as recited in claim 1, further comprising a power-on switch which applies power to said numeric display and to said microprocessor; wherein said microprocessor automatically turns said poweroff after a predetermined period of time.

8. A random lottery computer, as recited in claim 1, further comprising a power-off switch which removes said power from said numeric display and said microprocessor when depressed.

9. A random lottery computer, as recited in claim 1, further comprising an initialize switch which executes the actual random number selection.

10. A random lottery computer, as recited in claim 1, further comprising an oscillator resistor which determines the clock rate of said microprocessor thereby determining the rate at which said random numbers are selected.

11. A random lottery computer, as recited in claim 1, further comprising an alphanumeric display connected to display output terminals of the microprocessor, the microprocessor being adapted to cause the alphanumeric display to flash alphanumeric characters on and off until the lottery-selection play switch is actuated.

12. A random lottery computer for generating random numeric lottery selections, each lottery selection comprising a plurality of numeric entities, the random lottery computer comprising:

(a) a housing;

(b) a substantially visually unitary numeric display mounted in the housing for displaying the numeric lottery selections generated by the random lottery computer;

(c) a microprocessor mounted in the housing having switch-state input terminals and display output terminals, the display output terminals being connected to the numeric display, the microprocessor being adapted to generate random numeric lottery selections in accordance with lottery-game requirements of a user-selectable one of a plurality of predetermined lottery games and transmitting display signals encoding such lottery selections from the display output terminals to cause such lottery selections to be displayed by the numeric display of the random lottery computer, a particular lottery game in accordance with which a lottery selection is made being specified by switch-state signals applied to switch-state input terminals of the microprocessor;

(d) electric power supply means located in the housing for supplying electric power to the microprocessor and the numeric display;

(e) a single user-actuatable multistate game-selector switch mounted in the housing of the random lottery computer and connected to switch-state input terminals of the microprocessor, each position of the game-selector switch being associated with a predetermined set of lottery-game requirements, the microprocessor being adapted to take account of the set of lottery-game requirements associated with any user-selected position of the game-selector switch in generating random numeric lottery selections, each such set of lottery-game requirements specifying at least a number of numeric entities included in the lottery selection for the game and a number of digits in each numeric entity, at least one first set of lottery-game requirements associated with a first position of the game-selector switch specifying one digit per numeric entity and at least one second set of lottery-game requirements associated with a second position of the game-selector switch different from said first state specifying two digits per numeric entity;

(f) user-actuatable entity-upper-limit switch means mounted in the housing and connected to a switch-state input terminal of the microprocessor, the microprocessor being adapted to set in response in actuation of the entity-upper-limit switch means an upper limit for the numeric entities for the random numeric lottery selections generated in accordance with the set of lottery-game requirements associated with at least one state of the game-selector switch, the state of the game-selector switch defining a settable-upper-limit-game state; and (g) A user-actuatable lottery-selection play switch mounted in the housing of the random lottery computer and connected to a switch-state input terminal of the microprocessor, the microprocessor being adapted to generate a random numeric lottery selection in response to actuation of the lottery-selection play switch in accordance with the set of lottery-game requirements associated with any user-selected one of the states of the game-selector switch and, to an extent consistent with said set of lottery-game requirements, the upper limit for the numeric entities of the random numeric lottery selections specified by actuation of the entity-upper-limit switch means.

13. The random lottery computer according to claim 12 in which the entity-upper-limit switch means includes an incrementing switch and a decrementing switch, the microprocessor being adapted to increment in response to actuation of the incrementing switch the upper limit for the random numeric lottery selections generated in accordance with the set of lottery-game requirements associated with the settable-upper-limit-game state of the game-selector switch, and to decrement said upper limit in response to actuation of the decrementing switch.

14. The random lottery computer according to claim 12 in which the multistate game-selector switch is a user-positionable multiposition switch, each position of the switch defining a state of the switch associated with a predetermined set of lottery-game requirements.

* * * * *